US012621300B2

(12) United States Patent
Lehtovirta et al.

(10) Patent No.: US 12,621,300 B2
(45) Date of Patent: May 5, 2026

(54) DIGEST ACCESS AUTHENTICATION FOR A CLIENT DEVICE

(71) Applicant: Telefonaktiebolaget LM Ericsson (publ), Stockholm (SE)

(72) Inventors: Vesa Lehtovirta, Espoo (FI); Jari Arkko, Kauniainen (FI); Mohit Sethi, Helsinki (FI); John Mattsson, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 138 days.

(21) Appl. No.: 18/569,726

(22) PCT Filed: Jun. 16, 2021

(86) PCT No.: PCT/EP2021/066168
§ 371 (c)(1),
(2) Date: Dec. 13, 2023

(87) PCT Pub. No.: WO2022/262962
PCT Pub. Date: Dec. 22, 2022

(65) Prior Publication Data
US 2024/0283794 A1      Aug. 22, 2024

(51) Int. Cl.
*H04W 12/06*          (2021.01)
*H04L 9/40*            (2022.01)
(52) U.S. Cl.
CPC ........ *H04L 63/101* (2013.01); *H04L 63/0846* (2013.01); *H04L 63/1466* (2013.01); *H04L 63/205* (2013.01); *H04L 2463/082* (2013.01)
(58) Field of Classification Search
CPC ............... H04L 63/101; H04L 63/0846; H04L 63/1466; H04L 63/205; H04L 2463/082;
(Continued)

(56) References Cited

U.S. PATENT DOCUMENTS

| | | | |
|---|---|---|---|
| 2005/0044365 A1* | 2/2005 | Haukka ............... | H04L 63/1466 726/4 |
| 2013/0174241 A1* | 7/2013 | Cha .................... | H04L 63/0815 726/7 |
| 2017/0063540 A1* | 3/2017 | Blommaert ......... | H04W 12/069 |

OTHER PUBLICATIONS

Reschke, J. et al., "The 'Basic' HTTP Authentication Scheme", Internet Engineering Task Force (IETF), RFC: 7617 ISSN: 2070-1721, Sep. 2015, pp. 1-15, IEFT.
(Continued)

*Primary Examiner* — Amie C. Lin
(74) *Attorney, Agent, or Firm* — Sonoda & Kobayashi Intellectual Property Law; Darren M. Gardner

(57) ABSTRACT

A method comprising a client device performing digest access authentication with a server device. The digest access authentication comprises sending a first request towards the server device for accessing a resource. The digest access authentication comprises receiving a first response from the server device. The first response comprises at least two challenges and indications of as many different digest algorithms, one digest algorithm is associated with each challenge. The digest access authentication comprises calculating a response to one of the challenges using the digest algorithm associated with said one of the challenges. The response to said one of the challenges is indicative of all of the different digest algorithms. The digest access authentication comprises sending a second request towards the server device for accessing the resource. The second request comprises the response to said one of the challenges. The digest access authentication comprises receiving a second response from the server device. The second response indicates successful digest access authentication with the server device.

16 Claims, 8 Drawing Sheets

(58) Field of Classification Search
CPC . H04W 12/06; G06F 21/36; G06F 2221/2103
See application file for complete search history.

(56)                    References Cited

OTHER PUBLICATIONS

Niemi, A. et al., "Hypertext Transfer Protocol (HTTP) Digest Authentication Using Authentication and Key Agreement (AKA)", Networking Working Group, RFC: 3310, Sep. 2002, pp. 1-18, IETF.
Torvinen, V. et al., "Hypertext Transfer Protocol (HTTP) Digest Authentication Using Authentication and Key Agreement (AKA) Version-2", Network Working Group, RFC: 4169, Nov. 2005, pp. 1-13, IETF.
Shekh-Yusef, R. et al., "HTTP Digest Access Authentication", Internet Engineering Task Force (IETF), RFC: 7616 ISSN: 2070-1721, Sep. 2015, pp. 1-32, IETF.

* cited by examiner

Client device  Server device

S401.HTTP GET /resource/protected

S402.Unauthorized WWW-Authenticate 1
realm, nonce, algorithm1, suites etc.
WWW-Authenticate2 realm, nonce,
algorithm2, etc.

S403.HTTP GET /resource/protected
Authorization username, response, algorithm,
password, cnonce, qop, etc.

S404.HTTP 200 OK Authentication-Info
nextnonce, rspauth [Resource in payload]

DIGEST ACCESS AUTHENTICATION FOR A CLIENT DEVICE

TECHNICAL FIELD

Embodiments presented herein relate to methods, a client device, a server device, computer programs, and a computer program product for digest access authentication.

BACKGROUND

In general terms, in computer security, challenge-response authentication is a family of protocols in which one party presents a question (a "challenge") and another party must provide a valid answer (a "response") to be authenticated. The simplest example of a challenge-response protocol is password authentication, where the challenge is asking for the password and the valid response is based on the correct password.

So-called HTTP Digest Access Authentication, as defined in RFC 7616, defines a simple challenge-response authentication method for the Hypertext Transfer Protocol (HTTP). When a client device using HTTP tries to access a protected resource at a server device, the server device can send a challenge and authenticate the client device before allowing access to the protected resource. HTTP Digest authentication provides better security when compared to the basic HTTP authentication scheme defined in RFC 7617. An example message exchange between a client device and a server device for HTTP digest is shown in FIG. 1.

Step S1: The client device sends an HTTP request (shown as GET) to access a protected resource at the server device.

Step S2: The server device sends an HTTP response with the status code 401 unauthorized. This message includes a WWW-Authenticate header (where WWW is short for world wide web). The header value includes parameters such as realm, nonce, algorithm, qop, etc. The realm is a string that contains information about the entity (server) performing authentication. It can be of the form somename@example.org. The nonce is a unique string generated by the server device for each 401 response with the WWW-Authenticate header. The nonce ensures freshness during authentication and prevents replay attacks. The algorithm is a string indicating the algorithm which the client device should use for preparing the digest response. The algorithms can be MD5, SHA256, etc. or MD5-sess, SHA-256-sess, etc.

The 'sess' denotes the session variant of digest authentication and use slightly different calculations for generating the correct digest response. The session variant creates a session key for the authentication of subsequent requests and responses. The qop defines the quality of protection parameter and can be "auth" for authentication and "auth-int" for authentication with integrity protection. These parameters comprise a challenge for the client device that the client device must successfully respond to before being allowed to access the protected resource.

Step S3: The client device sends another HTTP request (shown as GET) with an Authorization header. The Authorization header includes parameters such as username, qop, response, uri etc. The username is the name of user of the server device. The qop defines the quality of protection selected by the client device. It is one of the qop offered by the server device. The response is a string of (hexadecimal) digits that is calculated based on the challenge and it proves the client device's knowledge of the password. The uri is the requested uniform resource identifier. In the example shown in FIG. 1, the requested uri is "/resource/protected". The client device uses the specified algorithm to compute the response based on the challenge. One example of how the response can be calculated will be described in the following.

response=H(H(A1):nonce:nc:cnonce:qop:H(A2)), where H(x) is a cryptographic hash function operating on the variable x, A1=username:realm:passwd, if the algorithm used is MD5, SHA256 etc., or A1=H(username:realm:passwd:nonce-prime:cnonce-prime), if the algorithm uses is the session variant, i.e., MD5-sess, SHA-256-sess. Here nonce-prime is the nonce sent by the server in the WWW-Authenticate header and cnonce-prime is the cnonce included by the client in the response, and A2=method:request-uri, if the qop used is auth, or A2=method:request-uri: H(entity-body), if the qop used is auth-int. The entity-body is obtained from the message-body by decoding any Transfer-Encoding that might have been applied.

The method depends on the request HTTP method (for example: GET, PUT, POST etc.).

Step S4: The server device verifies the response from the client device. If the response is correct, the server device sends a HTTP response with status code 200 OK to the client device. The response can also include an Authentication-Info header to optionally support mutual authentication, whereby, the server device also proves its knowledge of the password in the parameter rspauth of the Authentication-Info header. The server knowledge of password in the Authentication-Info header is calculated similarly as the response is calculated by the client device, except with the following differences:

A2=request-uri, if qop used is auth, and

A2=request-uri ":" H(entity-body).

That is, the calculations are almost identical except that the requested method is not included.

The Digest Authentication scheme can also be used for authenticating users to proxies. In such scenarios, the WWW-Authenticate header is replaced with the Proxy-Authenticate header, the Authorization header is replaced with the Proxy-Authorization header, and the Authentica-tion-Info with the Proxy-Authentication-Info header, respectively.

Digest authentication, as specified in RFC 7616, also supports negotiation of the digest algorithm. The server device in such cases challenges the client device by responding with "401 Unauthorized" and including two or more WWW-Authenticate header fields, each with a different digest algorithm. A corresponding example message exchange between a client device and a server device for HTTP digest is shown in FIG. 2. In this example, the HTTP response with the status code 401 unauthorized comprises two WWW-Authenticate header fields. Each header has a different digest algorithm. The client device on receiving multiple headers selects its most preferred and/or secure digest algorithm. The client device calculates the digest response and includes it in the authorization header.

Step S1a: The client device sends an HTTP request (shown as GET) to access a protected resource at the server device. Step 1a is thus the same as above step S1.

Step S2a: The server device sends an HTTP response with the status code 401 unauthorized. This message includes two WWW-Authenticate headers. The header values include parameters such as realm, nonce, algorithm, qop, etc. Step 2*a* is thus the same as above step 2 except that there are two WWW-Authenticate header fields, each with its own digest algorithm.

Step S3*a*: The client device sends another HTTP request (shown as GET) with an Authorization header. The response is a string of (hexadecimal) digits that is calculated based on one of the digest algorithms and its challenge. Step 3*a* is thus the same as above step S3 except that the client device first selects one of the specified algorithms to compute the response.

Step S4*a*: The server device verifies the response from the client device. If the response is correct, the server device sends a HTTP response with status code 200 OK to the client device. The response can also include an Authentication-Info header to optionally support mutual authentication, whereby, the server device also proves its knowledge of the password in the parameter rspauth of the Authentication-Info header. The server knowledge of password in the Authentication-Info header is calculated as in above step S4, but potentially the server device needs make separate calculations for each of the digest algorithms specified in step S2*a*.

A malicious proxy, or other type of attacker, might intercept the HTTP response and remove one (or more) of the WWW-Authenticate header fields before the HTTP response reaches the client device. For example, the malicious proxy might remove header fields with stronger security properties and thereby force the client device to use a weaker digest algorithm. This in turn leads to insecurities with respect to the negotiation of the digest algorithm in the HTTP Digest authentication.

Hence, there is a need for improved digest access authentication between a server device and a client device.

SUMMARY

An object of embodiments herein is to address the above issues by providing efficient digest access authentication between a server device and a client device that does not suffer from the above issues, or at least where the above issues have been mitigated or reduced.

According to a first aspect there is presented a method for digest access authentication. The method is performed by a client device. The method comprises performing digest access authentication with a server device. The digest access authentication comprises sending a first request towards the server device for accessing a resource. The digest access authentication comprises receiving a first response from the server device. The first response comprises at least two challenges and indications of as many different digest algorithms, one digest algorithm is associated with each challenge. The digest access authentication comprises calculating a response to one of the challenges using the digest algorithm associated with said one of the challenges. The response to said one of the challenges is indicative of all of the different digest algorithms. The digest access authentication comprises sending a second request towards the server device for accessing the resource. The second request comprises the response to said one of the challenges. The digest access authentication comprises receiving a second response from the server device. The second response indicates successful digest access authentication with the server device.

According to a second aspect there is presented a client device for digest access authentication. The client device comprises processing circuitry. The processing circuitry is configured to cause the client device to perform digest access authentication with a server device. The processing circuitry is configured to cause the client device to, as part of performing the digest access authentication, send a first request towards the server device for accessing a resource. The processing circuitry is configured to cause the client device to, as part of performing the digest access authentication, receive a first response from the server device. The first response comprises at least two challenges and indications of as many different digest algorithms, one digest algorithm is associated with each challenge. The processing circuitry is configured to cause the client device to, as part of performing the digest access authentication, calculate a response to one of the challenges using the digest algorithm associated with said one of the challenges. The response to said one of the challenges is indicative of all of the different digest algorithms. The processing circuitry is configured to cause the client device to, as part of performing the digest access authentication, send a second request towards the server device for accessing the resource. The second request comprises the response to said one of the challenges. The processing circuitry is configured to cause the client device to, as part of performing the digest access authentication receive a second response from the server device. The second response indicates successful digest access authentication with the server device.

According to a third aspect there is presented a client device for digest access authentication. The client device comprises an authentication module configured to perform digest access authentication with a server device. The client device further comprises, to perform the digest access authentication, a send module configured to send a first request towards the server device for accessing a resource. The client device further comprises, to perform the digest access authentication, a receive module configured to receive a first response from the server device. The first response comprises at least two challenges and indications of as many different digest algorithms, one digest algorithm is associated with each challenge. The client device further comprises, to perform the digest access authentication, a calculate module configured to calculate a response to one of the challenges using the digest algorithm associated with said one of the challenges. The response to said one of the challenges is indicative of all of the different digest algorithms. The client device further comprises, to perform the digest access authentication, a send module configured to send a second request towards the server device for accessing the resource. The second request comprises the response to said one of the challenges. The client device further comprises, to perform the digest access authentication, a receive module configured to receive a second response from the server device. The second response indicates successful digest access authentication with the server device.

According to a fourth aspect there is presented a computer program for digest access authentication, the computer program comprising computer program code which, when run on processing circuitry of a client device, causes the client device to perform a method according to the first aspect.

According to a fifth aspect there is presented a method for digest access authentication. The method is performed by a server device. The method comprises performing digest access authentication with a client device. The digest access authentication comprises receiving a first request from the client device for accessing a resource. The digest access authentication comprises sending a first response towards the client device. The first response comprises at least two challenges and indications of as many different digest algorithms, one digest algorithm is associated with each challenge. The digest access authentication comprises receiving a second request from the client device for accessing the resource. The second request comprises a response to one of the challenges. The digest access authentication comprises verifying correctness of the response to said one of the challenges, wherein correctness indicates that the response to said one of the challenges has been calculated using one of the different digest algorithms and that the response to said one of the challenges is indicative of all of the different digest algorithms. The digest access authentication comprises sending a second response towards the client device. The second response indicates successful digest access authentication with the client device, only when having successfully verified correctness of the response to said one of the challenges.

According to a sixth aspect there is presented a server device for digest access authentication. The server device comprises processing circuitry. The processing circuitry is configured to cause the server device to perform digest access authentication with a client device. The processing circuitry is configured to cause the server device to, as part of performing the digest access authentication, receive a first request from the client device for accessing a resource. The processing circuitry is configured to cause the server device to, as part of performing the digest access authentication, send a first response towards the client device. The first response comprises at least two challenges and indications of as many different digest algorithms, one digest algorithm is associated with each challenge. The processing circuitry is configured to cause the server device to, as part of performing the digest access authentication, receive a second request from the client device for accessing the resource. The second request comprises a response to one of the challenges. The processing circuitry is configured to cause the server device to, as part of performing the digest access authentication, verify correctness of the response to said one of the challenges, wherein correctness indicates that the response to said one of the challenges has been calculated using one of the different digest algorithms and that the response to said one of the challenges is indicative of all of the different digest algorithms. The processing circuitry is configured to cause the server device to, as part of performing the digest access authentication, send a second response towards the client device. The second response indicates successful digest access authentication with the client device, only when having successfully verified correctness of the response to said one of the challenges.

According to a seventh aspect there is presented a server device for digest access authentication. The server device comprises an authentication module configured to perform digest access authentication with a client device. The server device further comprises, to perform the digest access authentication, a receive module configured to receive a first request from the client device for accessing a resource. The server device further comprises, to perform the digest access authentication, a send module configured to send a first response towards the client device. The first response comprises at least two challenges and indications of as many different digest algorithms, one digest algorithm is associated with each challenge. The server device further comprises, to perform the digest access authentication, a receive module configured to receive a second request from the client device for accessing the resource. The second request comprises a response to one of the challenges. The server device further comprises, to perform the digest access authentication, a verify module configured to verify correctness of the response to said one of the challenges, wherein correctness indicates that the response to said one of the challenges has been calculated using one of the different digest algorithms and that the response to said one of the challenges is indicative of all of the different digest algorithms. The server device further comprises, to perform the digest access authentication, a send module configured to send a second response towards the client device. The second response indicates successful digest access authentication with the client device, only when having successfully verified correctness of the response to said one of the challenges.

According to an eighth aspect there is presented a computer program for digest access authentication, the computer program comprising computer program code which, when run on processing circuitry of a server device, causes the server device to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these methods, these client devices, these server devices, these computer programs, and this computer program product provide efficient digest access authentication.

Advantageously, the proposed digest access authentication does not suffer from the issues disclosed above.

Advantageously, some embodiments of the proposed digest access authentication enhances the security of HTTP digest authentication by providing secure negotiation of the digest algorithms.

Advantageously, some embodiments of the proposed digest access authentication can simplify implementation of the server device whilst still allowing the server device to offer and use several digest algorithms.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
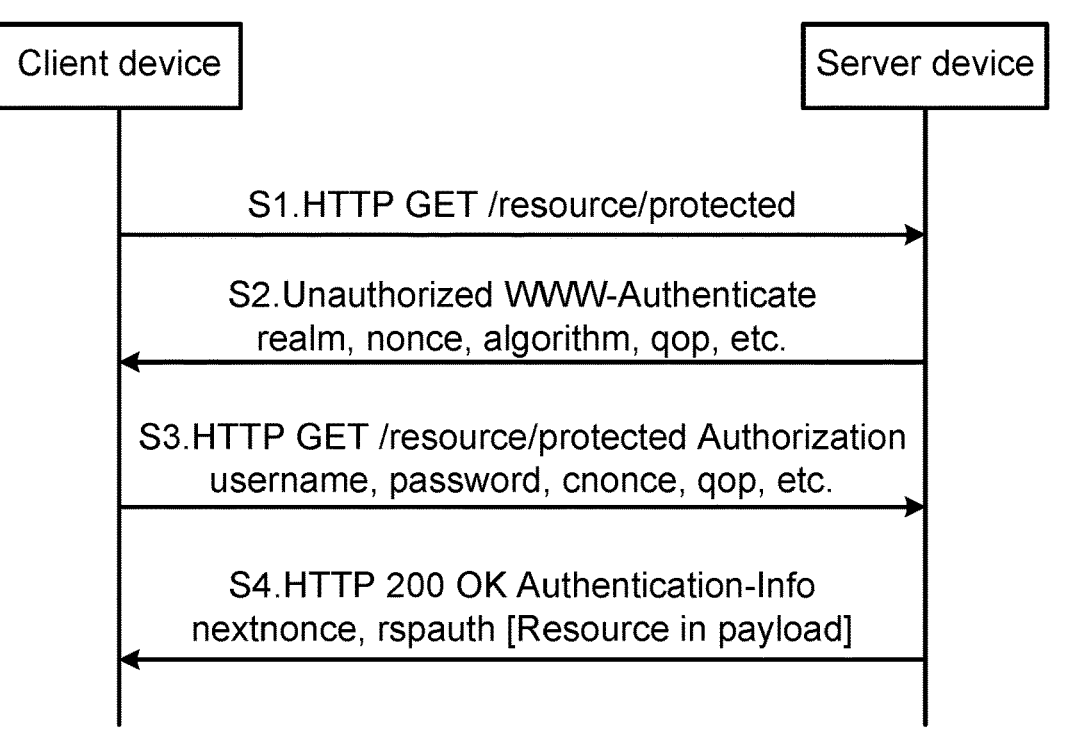
FIGS. 1 and 2 are signalling diagrams according to examples.
Figure 2:
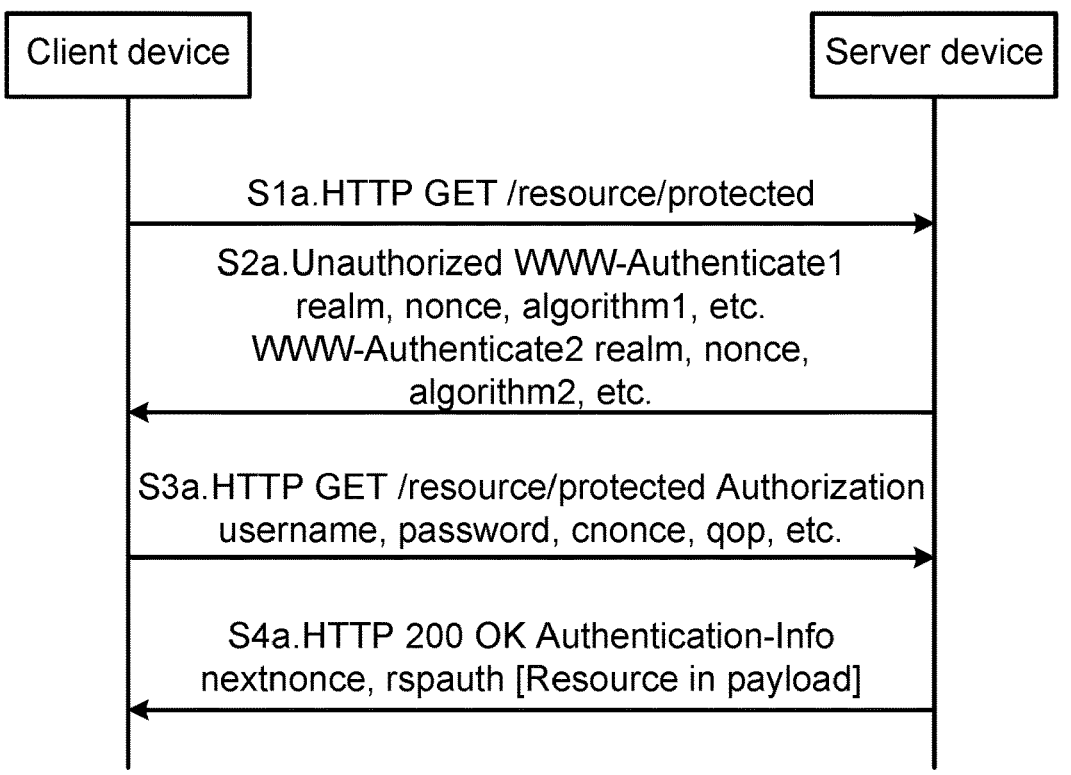

FIG. 1 is a schematic diagram illustrating a communication system 100 where embodiments presented herein can be applied. The communication system 100 comprises client devices 200, a server device 300, and a malicious proxy 500. The client devices 200 and the server device 300 communicate over a network 400. The network might be a wireless network, or a wired network, or a partly wireless network and a partly wired network. As such, the network 400 might comprises a plurality of network entities, such as access network nodes, gateways, core network nodes, etc.

Figure 3:
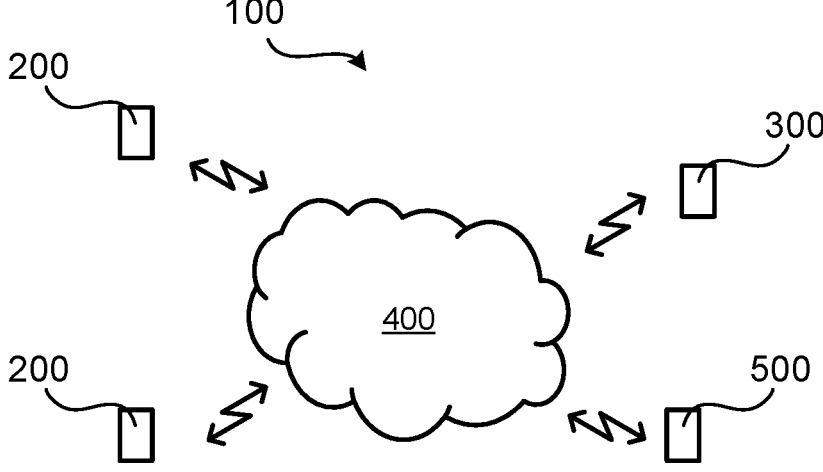
FIG. 3 is a schematic diagram illustrating a communication system according to embodiments.

As noted above, there is a need for improved digest access authentication between a server device 300 and a client device 200. In FIG. 3, this is represented by the malicious proxy 500 that represents an attacker that aims to intercept messages communicated between the client devices 200 and the server device 300 over the network 400. For example, one object of the malicious proxy 500 might be to overhear sensitive information, such as passwords, keys, etc. that is intended to be kept private at the client devices 200 and the server device 300.

The embodiments disclosed herein therefore relate to improved digest access authentication. In order to obtain improved digest access authentication there is provided a client device 200, a method performed by the client device 200, a computer program product comprising code, for example in the form of a computer program, that when run on processing circuitry of the client device 200, causes the client device 200 to perform the method. In order to obtain digest access authentication there is further provided a server device 300, a method performed by the server device 300, and a computer program product comprising code, for example in the form of a computer program, that when run on processing circuitry of the server device 300, causes the server device 300 to perform the method.

According to at least some of the herein disclosed embodiments, information of all digest algorithms specified by the server node 300 is included in the response that the client node 200 sends back to the server device 300. This is achieved by information indicative of all digest algorithms offered by the server device 300 is included in the digest response calculation. This prevents downgrade or selected algorithm attacks.

Figure 4:
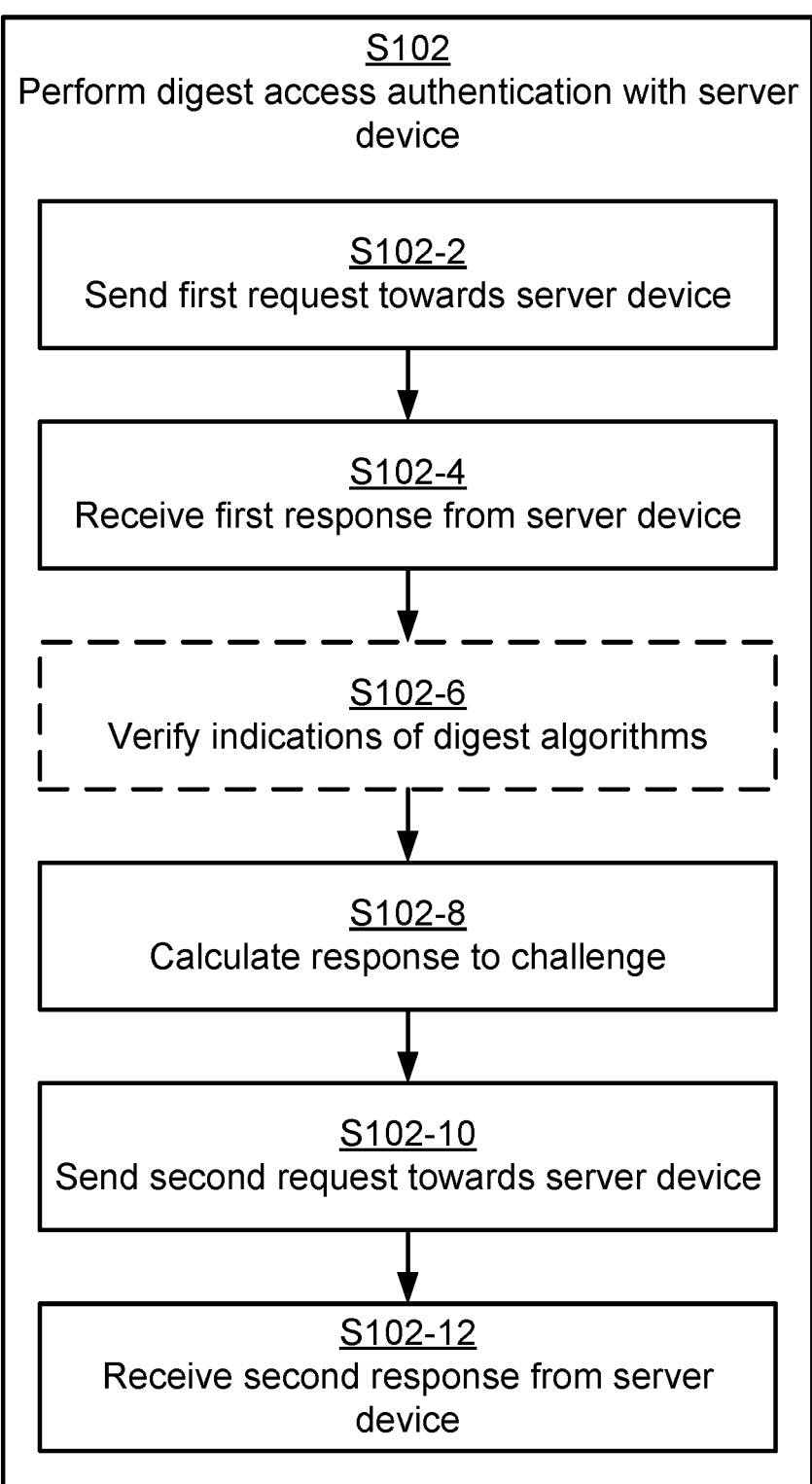
FIGS. 4 and 5 are flowcharts of methods according to embodiments.

Reference is now made to FIG. 4 illustrating a method for digest access authentication as performed by the client device 200 according to an embodiment.

S102: The client device 200 performs digest access authentication with the server device 300.

The digest access authentication comprises:

S102-2: The client device 200 sending a first request towards the server device 300 for accessing a resource.

S102-4: The client device 200 receiving a first response from the server device 300.

The first response comprises at least two challenges and indications of as many different digest algorithms; one digest algorithm being associated with each challenge.

S102-8: The client device 200 calculating a response to one of the challenges using the digest algorithm associated with this one of the challenges. The response to this one of the challenges is indicative of all of the different digest algorithms.

S102-10: The client device 200 sending a second request towards the server device 300 for accessing the resource. The second request comprises the response to this one of the challenges.

S102-12: The client device 200 receiving a second response from the server device 300. The second response indicates successful digest access authentication with the server device 300.

Embodiments relating to further details of digest access authentication as performed by the client device 200 will now be disclosed.

There might be different ways for the at least two challenges and indications of as many different digest algorithms to be provided in the first response received in S102-4. In some aspects, the indications of digest algorithms are provided in WWW-Authenticate header fields or in Proxy-Authenticate header fields. That is, in some embodiments, in the first response, each of the indications of the different digest algorithms is provided in its own WWW-Authenticate header field or its own Proxy-Authenticate header field.

There might be different ways for the client device 200 to calculate the response to said one of the challenges. In some aspects, the response to the challenge is calculated as a function of a nonce. That is, in some embodiments, each of the challenges comprises a nonce, and wherein the response to said one of the challenges is calculated as a function of the nonce for said one of the challenges. In general terms, calculating the response to said one of challenges might comprise calculating a cryptographic hash function output using a cryptographic hash function, where the cryptographic hash function differs between the different digest algorithms. Non-limiting examples of cryptographic hash function will be provided below.

In some aspects the client device 200 reports the used digest algorithm back to the server device 300. That is, in some embodiments, the second request further comprises an indication of the digest algorithm used for calculating the response to said one of the challenges. This can simplify the verification of the response at the server side (see, S202-1 below.)

There might be different ways for the response to said one of the challenges to be provided in the second request in S102-10. In some aspects, the response to the challenge is provided in an authorization header. That is, in some embodiments, the second request comprises an authorization header, and the response to said one of challenges is provided in the authorization header.

In some aspects, the client device 200 also received at least one resource from the server device 300. Particularly, in some embodiments, the second response received from the server device 300 in S102-12 further comprises the resource (as requested in S102-2).

There could be different examples of digest access authentication as part of which S102 (and thus also S102-2 to S102-12) is performed. In some non-limiting examples, the digest access authentication is any of: HTTP digest authentication, or Authentication and Key Agreement (AKA) digest access authentication, or Session Initiation Protocol (SIP) digest authentication.

There could be different ways in which the indications of the different digest algorithms are provided in the first response from the server device 300 in step S102-4. According to a first embodiment, the indications of the different digest algorithms are provided in plaintext in the first response. According to a second embodiment, the indications of the different digest algorithms are protected in the first response.

Further aspects of the first embodiment will be disclosed next and also below with reference to the signalling diagram of FIG. 6.

When the indications of the different digest algorithms are provided in plaintext in the first response, calculating the response to said one of challenge might comprise calculating a cryptographic hash function, where the cryptographic hash function is calculated for a string of characters, and where the string of characters comprises a concatenation of the indications.

Figure 7:
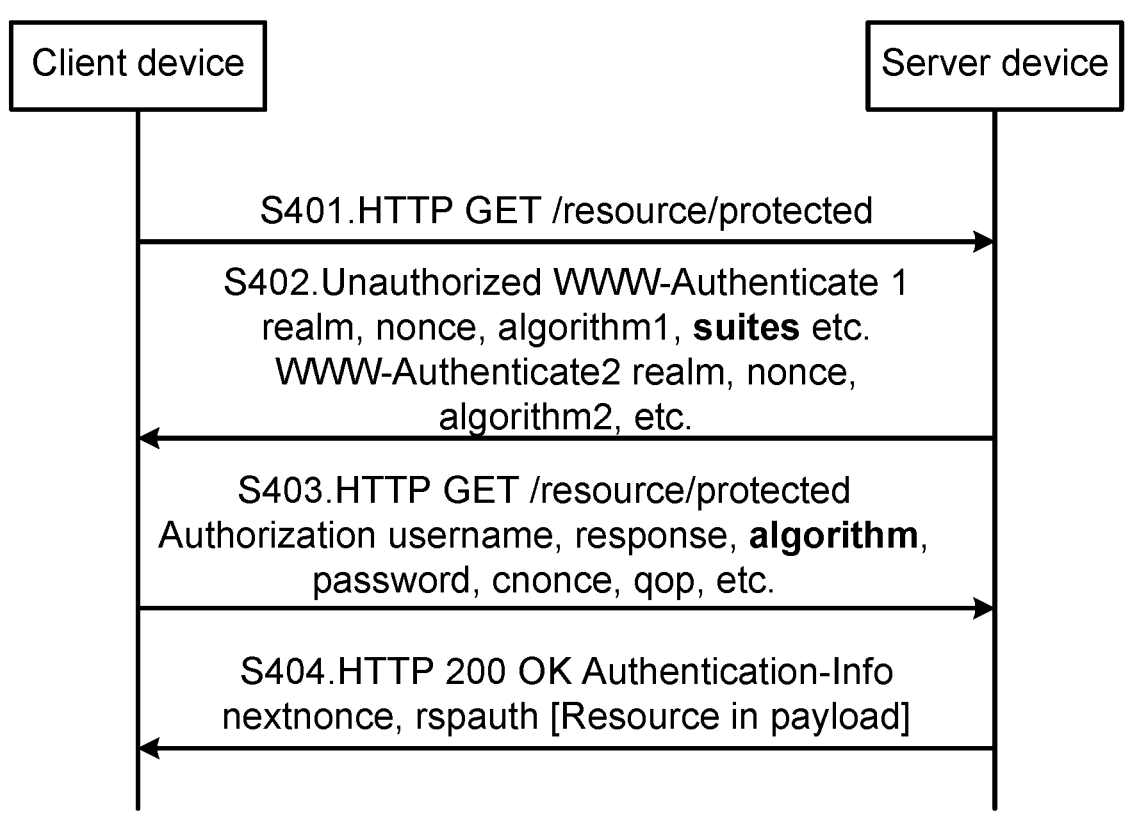

Further aspects of the second embodiment will be disclosed next and also below with reference to the signalling diagram of FIG. 7.

There could be different ways in which the indications of the different digest algorithms are protected in the first response. In some non-limiting examples, the different digest algorithms might be protected by being encrypted with a key derived from a password. Further in this respect, the indications might in the first response be provided by means of a hash-based message authentication code (HMAC) calculated for the indications. When the indications of the different digest algorithms are protected in the first response, the client device 200 might first verify that the response received in step S102-4 has not been intercepted and manipulated between being sent by the server device 300 and received by the client device 200. Particularly, the client device 200 might be configured to perform (optional) step S102-6 as part of the digest access authentication with the server device 300 in step S102:

S102-6: The client device 200 verifying the indications of the different digest algorithms before calculating the response to said one of the challenges.

The client device 200 might then calculate the response said one of the challenges in S102-8 by calculating a cryptographic hash function, where the cryptographic hash function is calculated for a string of characters, and where the string of characters comprises the indications.

Figure 5:
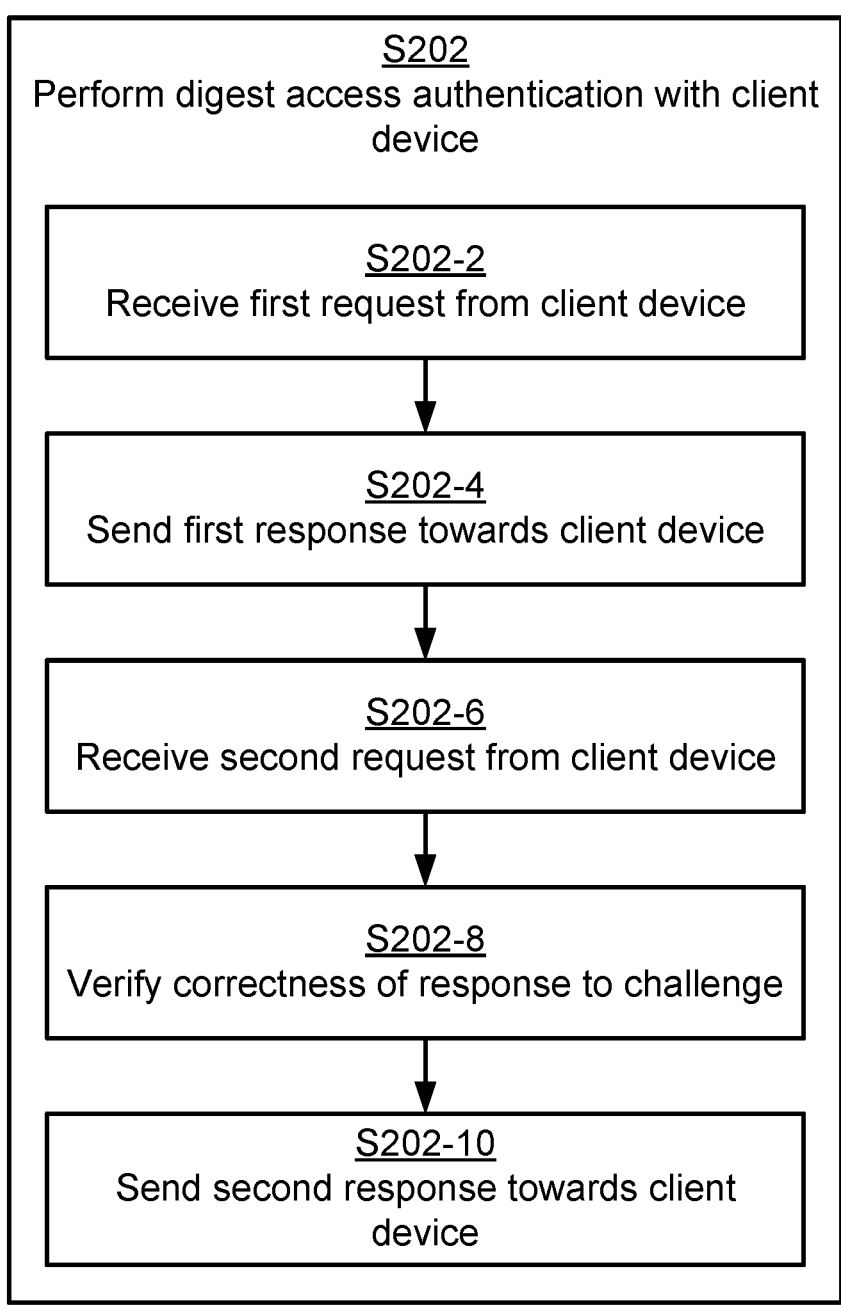

Reference is now made to FIG. 5 illustrating a method for digest access authentication as performed by the server device 300 according to an embodiment.

S202: The server device 300 performs digest access authentication with the client device 200.

The digest access authentication comprises:

S202-2: The server device 300 receiving a first request from the client device 200 for accessing a resource.

S202-4: The server device 300 sending a first response towards the client device 200. The first response comprises at least two challenges and indications of as many different digest algorithms; one digest algorithm being associated with each challenge.

S202-6: The server device 300 receiving a second request from the client device 200 for accessing the resource. The second request comprises a response to one of the challenges.

S202-8: The server device 300 verifying correctness of the response to this one of the challenges. Correctness indicates that the response to this one of the challenges has been calculated using one of the different digest algorithms and that the response to this one of the challenges is indicative of all of the different digest algorithms.

S202-10: The server device 300 sending a second response towards the client device 200. The second response indicates successful digest access authentication with the client device 200, only when having successfully verified correctness of the response to this one of the challenges.

Embodiments relating to further details of digest access authentication as performed by the server device 300 will now be disclosed.

As disclosed above, there might be different ways for the at least two challenges and indications of as many different digest algorithms to be provided in the first response sent in S202-4. In some embodiments, in the first response, each of the indications of the different digest algorithms is provided in its own WWW-Authenticate header field or its own Proxy-Authenticate header field.

As disclosed above, there might be different ways for the client device 200 to calculate the response to said one of the challenges. In some embodiments, each of the challenges comprises a nonce, and the response to said one of the challenges is to be calculated as a function of the nonce for said one of the challenges.

There might be different ways for the server device 300 to verifying correctness of the response in S202-8. In general terms, the server device 300 might perform the corresponding calculations as performed by the client device 200 for calculating the response in S102-8. Particularly, in some embodiments, verifying correctness of the response to said one of the challenges comprises calculating a cryptographic hash function output using a cryptographic hash function, where the cryptographic hash function differs between the different digest algorithms. Non-limiting examples of cryptographic hash function will be provided below. Further, in some aspects, the server device 300 verifies that digest response as received matches locally computed values. In particular, in some embodiments, verifying correctness of the response to said one of the challenges comprises verifying that a locally computed value equals the response to said one of the challenges, where how to calculate the locally computed value function differs between the different digest algorithms.

As disclosed above, in some aspects the client device 200 reports the used digest algorithm back to the server device 300. That is, in some embodiments, the second request further comprises an indication of the digest algorithm used for calculating the response to said one of the challenges. The server device 300 might then only makes calculations for the digest algorithm indicated by the client device 200 instead of trying to verify the response for each digest algorithm offered. That is, in some embodiments, the locally computed value is computed only for the digest algorithm as indicated in the second request.

As disclosed above, in some aspects, the response to the challenge is provided in an authorization header. That is, in some embodiments, the second request comprises an authorization header, and wherein the response to said one of the challenges is provided in the authorization header.

As disclosed above, in some aspects, the client device 200 also received at least one resource from the server device 300. Particularly, in some embodiments, the second response further comprises the resource.

There could be different examples of digest access authentication as part of which S202 (and thus also S202-2 to S202-10) is performed. In some non-limiting examples, the digest access authentication is any of: HTTP digest authentication, or AKA digest access authentication, or SIP digest authentication.

As disclosed above, according to a first embodiment, the indications of the different digest algorithms are provided in plaintext in the first response, whereas according to a second embodiment, the indications of the different digest algorithms are protected in the first response.

Further aspects of the first embodiment will be disclosed next and also below with reference to the signalling diagram of FIG. 6.

When the indications of the different digest algorithms are provided in plaintext in the first response, the cryptographic hash function (as used as part of verifying correctness of the response to said one of the challenges in S202-8) might be calculated for a string of characters, where the string of characters comprises a concatenation of the indications.

Further aspects of the second embodiment will be disclosed next and also below with reference to the signalling diagram of FIG. 7.

When the indications of the different digest algorithms are protected in the first response, the indications might in the first response be provided by means of a HMAC calculated for the indications.

Figure 6:
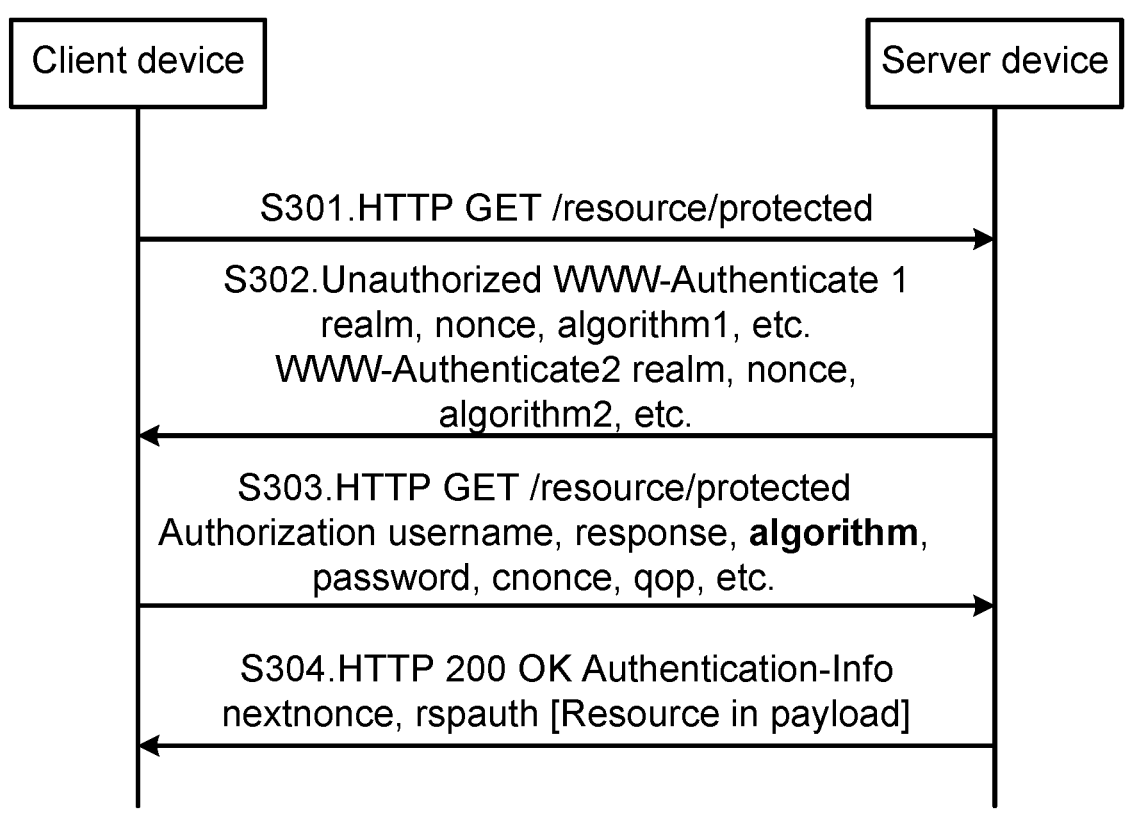
FIGS. 6 and 7 are signalling diagrams according to embodiments.

A first particular embodiment for digest access authentication based on at least some of the above disclosed embodiments will now be disclosed in detail with reference to the signalling diagram of FIG. 6.

S301: The client device 200 sends an HTTP request (shown as GET) to access a protected resource at the server device 300. One way to implement step S301 is to perform any of step S102-2 and step S202-2.

S302: The server device 300 sends an HTTP response with the status code 401 unauthorized. This message includes at least two WWW-Authenticate headers. The header values include parameters such as realm, nonce, algorithm, qop, etc. One way to implement step S302 is to perform any of step S102-4 and step S202-4.

S303: The client device 200 sends another HTTP request (shown as GET) with an Authorization header. The response is a string of (hexadecimal) digits that is calculated based on one of the digest algorithms and its challenge. As disclosed above in step S102-8, the response parameter calculation is indicative of all of the different digest algorithms. The client device 200 also optionally indicates the selected algorithm. The digest response can be calculated as follows:

response=H(H(A1):nonce:nc:cnonce:qop:H(A2)), where
A1=username:realm:passwd:algorithm1:algorithm2:algorithm, if the algorithm used is MD5, SHA256 etc., or
A1=H(username:realm:passwd:nonce-prime:cnonce-prime:algorithm1:algorithm2:algorithm), if the algorithm used is the session variant, i.e., MD5-sess, SHA-256-sess. Here nonce-prime is the nonce sent by the server device 300 in the WWW-Authenticate header and cnonce-prime is the cnonce included by the client device 200 in the response, and
A2=method:request-uri if the qop used is auth, or
A2=method:request-uri:H(entity-body) if the qop used is auth-int. Note the entity-body is not the body of the message.

The list of algorithms offered, and the algorithm selected by the client device 200 can be used in the calculation of other variables, such as A2 or response in addition to or instead of A1.

The same protection can also be afforded to other extensions of HTTP digest authentication such as digest AKA.

One way to implement step S303 is to perform any of step S102-8, S102-10, and step S202-6.

S304: The server device 300 performs the corresponding calculations and verifies that the digest response received matches the locally computed values. Optionally, the server device 300 can use the information of the selected algorithm indicated by the client device 200 and only perform the calculations for that algorithm, instead of trying to verify the response for each algorithm offered. If the verification succeeds, the server device 300 sends a HTTP response with status code 200 OK. If the setup support mutual authentication where the server device 300 also calculated the rspauth and includes it in an Authentication-Info header.

One way to implement step S304 is to perform any of step S102-12, S202-8, and step S202-10.

One issue with the embodiment in FIG. 6 is that even though an attack by a malicious proxy 500 is detected by the server device 300, it may already be too late. This is because the client device 200 would have revealed the response based on a weak algorithm if the stronger algorithms were removed by the malicious proxy 500. This issue is addressed by the digest authentication scheme according to a second particular embodiment that is also based on at least some of the above disclosed embodiments. The second particular embodiment will now be disclosed in detail with reference to the signalling diagram of FIG. 7.

S401: The client device 200 sends an HTTP request (shown as GET) to access a protected resource at the server device 300. One way to implement step S401 is to perform any of step S102-2 and step S202-2.

S402: The server device 300 sends an HTTP response with the status code 401 unauthorized. This message includes at least two WWW-Authenticate headers. The header values include parameters such as realm, nonce, algorithm, qop, etc. The server device 300 also calculates a new suites field as shown below and includes it in one or all the WWW-Authenticate headers.

key=H(password), where H is a memory-hard cryptographic hash function, and
suites=HMAC (key, algortihm1|algorithm2| . . . )

One way to implement step S402 is to perform any of step S102-4, S102-6 and step S202-4.

S403: The client device 200, before selecting one of the appropriate algorithms, the verifies the suites field with its knowledge of the password and the algorithms received. Only if the verification is correct, the client device 200 sends another HTTP request (shown as GET in the figure) with an Authorization header.

The response is a string of (hexadecimal) digits that is calculated based on one of the digest algorithms and its challenge. As disclosed above in step S102-8, the response parameter calculation is indicative of all of the different digest algorithms. Instead of adding all the algorithms offered by the server device 300 separately, the client device 200 might include the suites field received from the server device 300 in the calculation. The client device 200 also optionally indicates the selected algorithm. The digest response can be calculated as follows:

response=H(H(A1):nonce:nc:cnonce:qop:H(A2)), where
A1=username:realm:passwd:suites if the algorithm used
    is MD5, SHA256 etc., or
A1=H(username:realm:passwd:nonce-prime:cnonce-
    prime:suites) if the algorithm used is the session vari-
    ant, i.e., MD5-sess, SHA-256-sess. Here nonce-prime
    is the nonce sent by the server device 300 in the
    WWW-Authenticate header and cnonce-prime is the
    cnonce included by the client device 200 in the
    response, and
A2=method:request-uri if the qop used is auth, or
A2=method:request-uri: H(entity-body) if the qop used is
    auth-int.

One way to implement step S403 is to perform any of step S102-8, S102-10, and step S202-6.

S404: The server device 300 performs the corresponding calculations and verifies that the digest response received matches the locally computed values. Optionally, the server device 300 can use the information of the selected algorithm indicated by the client device 200 and only perform the calculations for that algorithm, instead of trying to verify the response for each algorithm offered. If the verification succeeds, the server device 300 sends a HTTP response with status code 200 OK. If the setup supports mutual authentication the server device 300 also calculates the rspauth and includes it in an Authentication-Info header.

One way to implement step S404 is to perform any of step S102-12, S202-8, and step S202-10.

Figure 8:
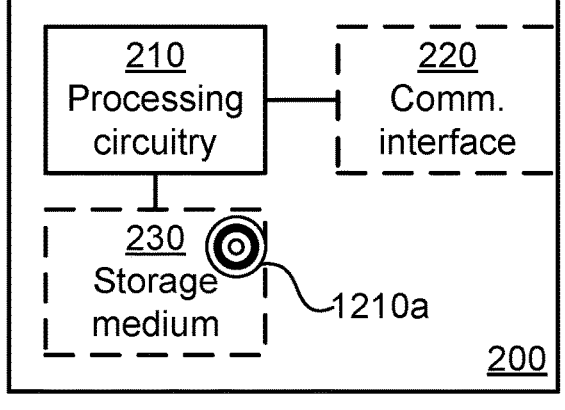
FIG. 8 is a schematic diagram showing functional units of a client device according to an embodiment.

FIG. 8 schematically illustrates, in terms of a number of functional units, the components of a client device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210a (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the client device 200 to perform a set of operations, or steps, as disclosed above. For example, the storage medium 230 may store the set of operations, and the processing circuitry 210 may be configured to retrieve the set of operations from the storage medium 230 to cause the client device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The client device 200 may further comprise a communications interface 220 for communications with other entities, functions, nodes, and devices, such as the server device 300. As such the communications interface 220 may comprise one or more transmitters and receivers, comprising analogue and digital components.

The processing circuitry 210 controls the general operation of the client device 200 e.g. by sending data and control signals to the communications interface 220 and the storage medium 230, by receiving data and reports from the communications interface 220, and by retrieving data and instructions from the storage medium 230. Other components, as well as the related functionality, of the client device 200 are omitted in order not to obscure the concepts presented herein.

Figure 9:
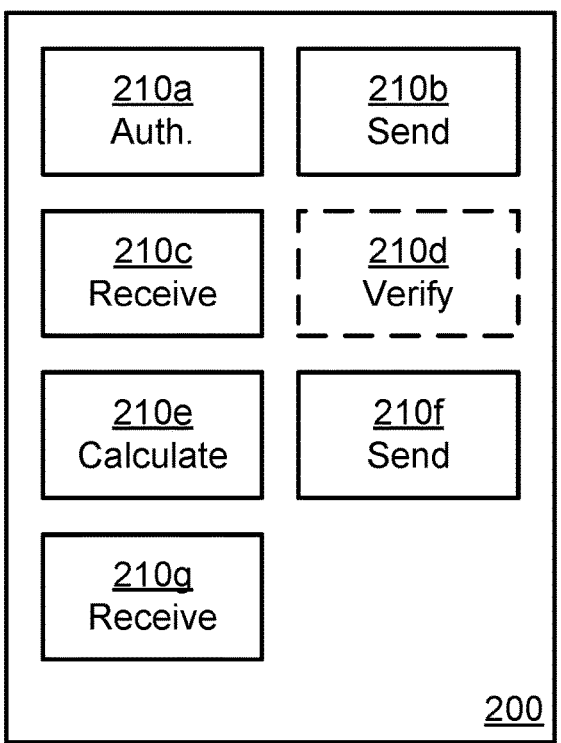
FIG. 9 is a schematic diagram showing functional modules of a client device according to an embodiment.

FIG. 9 schematically illustrates, in terms of a number of functional modules, the components of a client device 200 according to an embodiment. The client device 200 of FIG. 9 comprises a number of functional modules; an authenticate module 210a configured to perform step S102, a send module 210b configured to perform step S102-2, a receive module 210c configured to perform step S102-4, a calculate module 210e configured to perform step S102-8, a send module 210f configured to perform step S102-10, and a receive module 210g configured to perform step S102-12. The client device 200 of FIG. 9 may further comprise a number of optional functional modules, such as a verify module 210d configured to perform step S102-6.

In general terms, each functional module 210a:210g may be implemented in hardware or in software. Preferably, one or more or all functional modules 210a:210g may be implemented by the processing circuitry 210, possibly in cooperation with the communications interface 220 and/or the storage medium 230. The processing circuitry 210 may thus be arranged to from the storage medium 230 fetch instructions as provided by a functional module 210a:210g and to execute these instructions, thereby performing any steps of the client device 200 as disclosed herein.

The client device 200 may be provided as a standalone device or as a part of at least one further device. For example, the client device 200 may be provided in any of a portable wireless device, mobile station, mobile phone, handset, wireless local loop phone, user equipment (UE), smartphone, laptop computer, tablet computer, wireless modem, wireless sensor device, Internet of Things (IOT) device, network equipped vehicle, etc.

Figure 10:
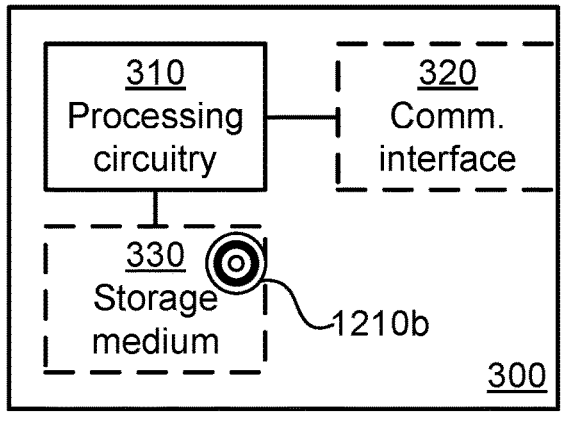
FIG. 10 is a schematic diagram showing functional units of a server device according to an embodiment.

FIG. 10 schematically illustrates, in terms of a number of functional units, the components of a server device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210b (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the server device 300 to perform a set of operations, or steps, as disclosed above. For example, the storage medium 330 may store the set of operations, and the processing circuitry 310 may be configured to retrieve the set of operations from the storage medium 330 to cause the server device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The server device 300 may further comprise a communications interface 320 for communications with other entities, functions, nodes, and devices, such as the client device 200. As such the communications interface 320 may comprise one or more transmitters and receivers, comprising analogue and digital components.

The processing circuitry 310 controls the general operation of the server device 300 e.g. by sending data and control signals to the communications interface 320 and the storage medium 330, by receiving data and reports from the communications interface 320, and by retrieving data and instructions from the storage medium 330. Other components, as well as the related functionality, of the server device 300 are omitted in order not to obscure the concepts presented herein.

Figure 11:
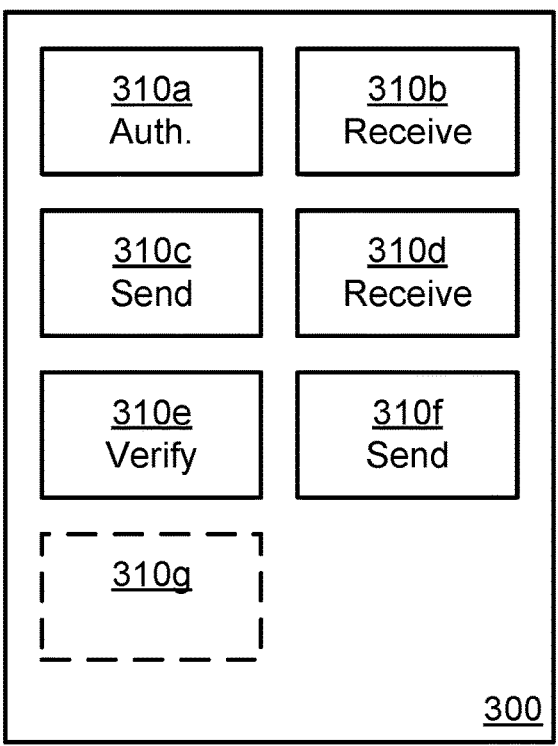
FIG. 11 is a schematic diagram showing functional modules of a server device according to an embodiment.

FIG. 11 schematically illustrates, in terms of a number of functional modules, the components of a server device 300 according to an embodiment. The server device 300 of FIG. 11 comprises a number of functional modules; an authenticate module 310a configured to perform step S202, a receive module 310b configured to perform step S202-2, a send module 310c configured to perform step S202-4, a receive module 310d configured to perform step S202-6, a verify module 310e configured to perform step 202-8, and a send module 310f configured to perform step S202-10. The server device 300 of FIG. 11 may further comprise a number of optional functional modules, as represented by functional module 310g. In general terms, each functional module 310a:310g may be implemented in hardware or in software. Preferably, one or more or all functional modules 310a:310g may be implemented by the processing circuitry 310, possibly in cooperation with the communications interface 320 and/or the storage medium 330. The processing circuitry 310 may thus be arranged to from the storage medium 330 fetch instructions as provided by a functional module 310a:310g and to execute these instructions, thereby performing any steps of the server device 300 as disclosed herein.

The server device 300 may be provided as a standalone device or as a part of at least one further device. A first portion of the instructions performed by the server device 300 may be executed in a first device, and a second portion of the instructions performed by the server device 300 may be executed in a second device; the herein disclosed embodiments are not limited to any particular number of devices on which the instructions performed by the server device 300 may be executed. Hence, the methods according to the herein disclosed embodiments are suitable to be performed by a server device 300 residing in a cloud computational environment. Therefore, although a single processing circuitry 310 is illustrated in FIG. 10 the processing circuitry 310 may be distributed among a plurality of devices, or nodes. The same applies to the functional modules 310a:310g of FIG. 11 and the computer program 1220b of FIG. 12.

Figure 12:
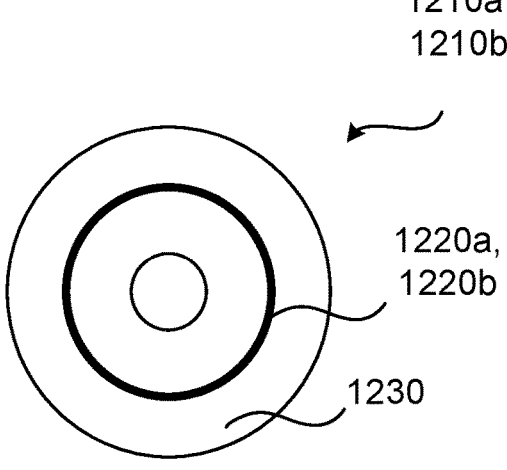
FIG. 12 shows one example of a computer program product comprising computer readable means according to an embodiment.

FIG. 12 shows one example of a computer program product 1210a, 1210b comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any steps of the client device 200 as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the server device 300 as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for digest access authentication, the method being performed by a client device and comprising:
performing digest access authentication with a server device, wherein performing the digest access authentication comprises:
sending a first request towards the server device for accessing a resource;
receiving a first response from the server device, wherein the first response comprises at least two challenges, and indications of as many different digest algorithms, one digest algorithm being associated with each challenge;
calculating a response to a selected one of the challenges using a selected one the digest algorithm associated with the selected one of the challenges, wherein a list of the different digest algorithms is used as an input in calculating the response by the selected one of the digest algorithms;
sending a second request towards the server device for accessing the resource, wherein the second request comprises the response to the one of the challenges; and
receiving a second response from the server device, wherein the second response indicates successful digest access authentication with the server device.

2. The method according to claim 1, wherein, in the first response, each of the indications of the different digest algorithms is provided in its own WWW-Authenticate header field or its own Proxy-Authenticate header field.

3. The method according to claim 1, wherein each of the challenges comprises a nonce, and wherein the response to the one of the challenges is calculated as a function of the nonce for the one of the challenges.

4. The method according to claim 1, wherein the second request further comprises an indication of the digest algorithm used for calculating the response to the one of the challenges.

5. The method according to claim 1, wherein the second request comprises an authorization header, and wherein the response to the one of the challenges is provided in the authorization header.

6. The method according to claim 1, wherein the second response further comprises the resource.

7. The method according to claim 1, wherein the digest access authentication is any of:

Hypertext Transfer Protocol (HTTP);

digest authentication;

Authentication and Key Agreement (AKA);

digest access authentication;

Session Initiation Protocol (SIP); and digest authentication.

8. The method according to claim 1, wherein calculating the response to the one of the challenges comprises calculating a cryptographic hash function output using a cryptographic hash function, and wherein the cryptographic hash function differs between the different digest algorithms.

9. The method according to claim 1, wherein the indications of the different digest algorithms are provided in plaintext in the first response.

10. The method according to claim 9, wherein calculating the response to the one of the challenges comprises calculating a cryptographic hash function, wherein the cryptographic hash function is calculated for a string of characters, and wherein the string of characters comprises a concatenation of the indications.

11. The method according to claim 1, wherein the indications of the different digest algorithms are protected in the first response.

12. The method according to claim 11, wherein the indications are in the first response provided by means of a hash-based message authentication code calculated for the indications.

13. The method according to claim 11, wherein the method further comprises:

verifying the indications of the different digest algorithms before calculating the response to the one of the challenges.

14. The method according to claim 13, wherein calculating the response to the one of the challenges comprises calculating a cryptographic hash function, wherein the cryptographic hash function is calculated for a string of characters, and wherein the string of characters comprises the indications.

15. A client device for digest access authentication, the client device comprising:

processing circuitry; and memory operatively coupled to the processing circuitry and comprising instructions that, when executed by the processing circuitry, configure the client device to:

perform digest access authentication with a server device; and as part of performing the digest access authentication:

send a first request towards the server device for accessing a resource;

receive a first response from the server device, wherein the first response comprises at least two challenges, and indications of as many different digest algorithms, one digest algorithm being associated with each challenge;

calculate a response to a selected one of the challenges using a selected one the digest algorithm associated with the selected one of the challenges, wherein a list of the different digest algorithms is used as an input in calculating the response by the selected one of the digest algorithms;

send a second request towards the server device for accessing the resource, wherein the second request comprises the response to the one of the challenges; and receive a second response from the server device, wherein the second response indicates successful digest access authentication with the server device.

16. A non-transitory computer-readable medium having a computer program for digest access authentication stored thereon that, when executed by processing circuitry of a client device, causes the client device to:

perform digest access authentication with a server device by:

sending a first request towards the server device for accessing a resource;

receiving a first response from the server device, wherein the first response comprises at least two challenges, and indications of as many different digest algorithms, one digest algorithm being associated with each challenge;

calculating a response to a selected one of the challenges using a selected one the digest algorithm associated with the selected one of the challenges, wherein a list of the different digest algorithms is used as an input in calculating the response by the selected one of the digest algorithms;

sending a second request towards the server device for accessing the resource, wherein the second request comprises the response to the one of the challenges; and receiving a second response from the server device, wherein the second response indicates successful digest access authentication with the server device.

* * * * *